United States Patent
Ma et al.

(10) Patent No.: US 9,118,846 B2
(45) Date of Patent: Aug. 25, 2015

(54) APPARATUS FOR GENERATING AN IMAGE WITH DEFOCUSED BACKGROUND AND METHOD THEREOF

(71) Applicant: SAMSUNG ELECTRONICS CO., LTD., Suwon-si (KR)

(72) Inventors: Gengyu Ma, Beijing (CN); Young Su Moon, Seoul (KR); Wentao Mao, Beijing (CN); Jung Uk Cho, Hwaseong-si (KR); Ji Yeun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/852,135

(22) Filed: Mar. 28, 2013

(65) Prior Publication Data
US 2013/0258138 A1   Oct. 3, 2013

(30) Foreign Application Priority Data
Mar. 30, 2012   (CN) .......................... 2012 1 0090971

(51) Int. Cl.
| | |
|---|---|
| H04N 5/228 | (2006.01) |
| H04N 5/262 | (2006.01) |
| H04N 5/232 | (2006.01) |
| G03B 13/00 | (2006.01) |
| H04N 5/272 | (2006.01) |
| G06T 5/00 | (2006.01) |
| H04N 21/431 | (2011.01) |

(52) U.S. Cl.
CPC ................ *H04N 5/272* (2013.01); *G06T 5/003* (2013.01); *H04N 5/23212* (2013.01); *H04N 5/23229* (2013.01); *H04N 21/4318* (2013.01)

(58) Field of Classification Search
None
See application file for complete search history.

(56) References Cited

U.S. PATENT DOCUMENTS

| | | | |
|---|---|---|---|
| 7,295,220 B2 | 11/2007 | Zhou et al. | |
| 8,253,799 B2 | 8/2012 | Elangovan et al. | |
| 8,339,500 B2 | 12/2012 | Hattori et al. | |
| 2007/0286520 A1* | 12/2007 | Zhang et al. | 382/264 |
| 2008/0130978 A1* | 6/2008 | Neemuchwala et al. | 382/132 |
| 2010/0149371 A1* | 6/2010 | Steinberg et al. | 348/222.1 |
| 2011/0280475 A1* | 11/2011 | Singhal et al. | 382/162 |
| 2012/0007960 A1* | 1/2012 | Kim et al. | 348/51 |
| 2013/0044227 A1* | 2/2013 | Uehara | 348/208.1 |
| 2013/0113962 A1* | 5/2013 | Li | 348/240.2 |

FOREIGN PATENT DOCUMENTS

KR   10-0867731   11/2008

* cited by examiner

*Primary Examiner* — Tuan Ho
*Assistant Examiner* — Shahbaz Nazrul
(74) *Attorney, Agent, or Firm* — NSIP Law

(57) ABSTRACT

Provided are an apparatus and method for generating an image with a defocused background. According to various aspects, a preview image is used as the basis for extracting a background distribution and a defocused background is generated based on the extracted background distribution. Accordingly, it is not necessary to photograph two or more images to generate a defocused background effect.

24 Claims, 4 Drawing Sheets

(A)

(B)

(C)

(D)

ND METHOD THEREOF

CROSS REFERENCE TO RELATED APPLICATION(S)

This application claims the benefit under 35 USC §119(a) of Chinese Patent Application No. 201210090971.0, filed on Mar. 30, 2012, in the Chinese Patent and Trademark Office, the entire disclosure of which is incorporated herein by reference for all purposes.

BACKGROUND

1. Technical Field

The following description relates to special effect processing on a photographed image, and more particularly, to a technology for defocusing a background portion of the photographed image.

2. Description of the Related Art

When capturing a photograph, a user usually focuses on an interested object to be photographed. For example, in portrait photography, the effect of a defocused background is becoming very popular. With such an effect, the photographed object itself is enhanced while the background portion becomes blurred. However, many current digital photographing devices are not provided with a sensor and an aperture that are large enough to obtain the desirable photographing effect.

In order to obtain an image with defocused background, a similar optical photographing effect can be simulated by a post digital process inside the photographing device. However, when performing the related post digital process, the photographing device needs to photograph two or more images for extracting a background distribution of the photographed image, which may cause inconvenience for the user.

Furthermore, the effect achieved by the current background defocusing technology is typically limited by the intensity of the environment light. For example, the effect of the flash matting technology is limited by the influence of the flash on the photographed object. Moreover, the technique of depth from defocus requires a relatively large calculation amount, which is not desirable.

SUMMARY

In an aspect, there is provided an apparatus for generating an image with a defocused background, the apparatus including a background distribution extraction unit configured to extract a background distribution based on a preview image corresponding to a photographed image, a defocused image generation unit configured to generate a defocused image for the photographed image, and an image combination unit for combining the defocused image with the photographed image based on the background distribution to generate the image with the defocused background.

The apparatus may further comprise a background segmentation unit configured to perform a binarization process on the background distribution to obtain a foreground portion and a background portion, wherein the background distribution indicates a probability distribution of a pixel of the photographed image belonging to the background, and the image combination unit is configured to combine a background of the defocused image with a foreground of the photographed image based on the foreground portion and the background portion to generate the image with defocused background.

The apparatus may further comprise a smooth processing unit configured to perform a smoothing process on an edge of the foreground portion and the background portion to obtain a smooth background distribution, wherein the image combination unit combines the defocused image with the photographed image based on the smooth background distribution to generate the image with defocused background.

The background segmentation unit may perform the binarization process based on a max-flow min-cut segmentation algorithm.

The smooth processing unit may perform the smoothing process on the edge of the foreground portion and the background portion based on a content of the preview image using a bilateral filter.

The background distribution extraction unit may be configured to extract the background distribution based on a luminance changing degree between the preview image and the photographed image, the preview image has a same focal length as that of the photographed image, the preview image is captured with a flash off, and the photographed image is captured with the flash on.

The background distribution extraction unit may be configured to extract the background distribution based on a contrast information of a plurality of preview images, and the plurality of preview images comprise different focal lengths.

The background distribution extraction unit may comprise an image reception unit configured to receive the preview image and the photographed image when a photographing environment is an indoor environment, the preview image comprising a same focal length as that of the photographed image, the preview image being captured with a flash off, and the photographed image being captured with the flash on, and further configured to receive a plurality of preview images when the photographing environment is an outdoor environment, the plurality of preview images comprising different focal lengths, an image information extraction unit configured to extract luminance information of the preview image and the photographed image when the photographing environment is the indoor environment, and configured to extract contrast information of the plurality of preview images when the photographing environment is the outdoor environment, and a background distribution generation unit configured to generate the background distribution based on a luminance changing degree between the preview image and the photographed image when the photographing environment is the indoor environment, and configured to generate the background distribution based on a contrast information of the plurality of preview images when the photographing environment is the outdoor environment.

The background distribution extraction unit may be further configured to determine whether the photographing environment is the indoor environment or the outdoor environment based on whether the flash is on.

Each preview image may be divided into a plurality of data blocks, the image information extraction unit may be configured to extract the contrast information of the plurality of data blocks in the respective preview images, and the background distribution generation unit is further configured to calculate a probability of each data block belonging to the background based on the contrast information, wherein the image information extraction unit is further configured to extract contrast information $C_i(B)$ of a $B^{th}$ data block in an $i^{th}$ preview image based on an equation of $$Ci(B) = \sum_{p(x,y) \in B} ((\nabla_x I_{p(x,y)})^2 + (\nabla_y I_{p(x,y)})^2),$$

where P(x,y) indicates a pixel, x is a horizontal coordinate of the pixel P(x,y), y is a vertical coordinate of the pixel P(x,y), $I_{p(x,y)}$ indicates a pixel value of the pixel P(x,y), $\nabla_x I_{p(x,y)}$ indicates a gradient of the pixel value $I_{p(x,y)}$ in an x axis, and $\nabla_y I_{p(x,y)}$ indicates a gradient of the pixel value $I_{p(x,y)}$ in a y axis, and the background distribution generation unit is further configured to calculate a probability of the $B^{th}$ data block belonging to the background based on an equation of $$D_{BG}(B) = \frac{\max_{i \in BG} C_i(B)}{\max_{i \in FG} C_i(B) + \max_{i \in BG} C_i(B)},$$

where $D_{BG}(B)$ indicates the probability of the $B^{th}$ data block belonging to the background, BG indicates a first group of preview images, FG indicates a second group of preview images, and background portions of the first group of preview images are clearer than those of the second group of preview images.

In an aspect, there is provided a method for generating an image with a defocused background, the method including extracting a background distribution based on a preview image corresponding to a photographed image, generating a defocused image for the photographed image, and combining the defocused image with the photographed image based on the background distribution to generate the image with the defocused background.

The method may further comprise performing a binarization process on the background distribution to obtain a foreground portion and a background portion, wherein the background distribution indicates a probability distribution for a pixel of the photographed image belonging to the background, performing a smoothing process on an edge of the foreground portion and the background portion to obtain a smooth background distribution, and combining the defocused image with the photographed image based on the smooth background distribution to generate the image with the defocused background.

The extracting the background distribution based on the preview image may comprise, in response to a photographing environment being an indoor environment, receiving the preview image and the photographed image, extracting luminance information of the preview image and the photographed image, and generating the background distribution based on a luminance changing degree between the preview image and the photographed image, wherein the preview image has a same focal length as that of the photographed image, and the preview image is captured with a flash off and the photographed image is captured with the flash on, and, in response to the photographing environment being an outdoor environment, receiving a plurality of preview images, extracting contrast information of the plurality of preview images, and generating the background distribution based on the contrast information of the plurality of preview images, wherein the plurality of preview images have different focal lengths.

In an aspect, there is provided an image processing device including an extractor configured to extract a background distribution of a photograph based on a preview image of the photograph, a defocuser configured to perform a blurring operation on the photograph to generate a defocused image, and a combiner configured to combine the photograph and the defocused image based on the background distribution to generate a photograph with a defocused background.

A foreground of the photograph with the defocused background may not be defocused.

The extractor may be configured to extract the background distribution of the photograph based on the preview image and based on the photograph, the preview image being captured without a flash and the photograph being captured with the flash.

The extractor may be configured to generate the background distribution for each pixel included in the background of the photograph.

The extractor may be configured to extract the background distribution of the photograph based on a plurality of preview images having different focal lengths.

The extractor may be further configured to divide each preview image into data blocks which each include a plurality of pixels, and the extractor may be configured to generate the background distribution for each data block included in the background of the photograph.

The extractor may be configured to divide the plurality of preview images into two groups including a first group which includes one or more preview images with a clearer foreground and a second group which includes one or more preview images with a clearer background, based on focal lengths of the plurality of preview images.

Other features and aspects may be apparent from the following detailed description, the drawings, and the claims.

Figure 1:
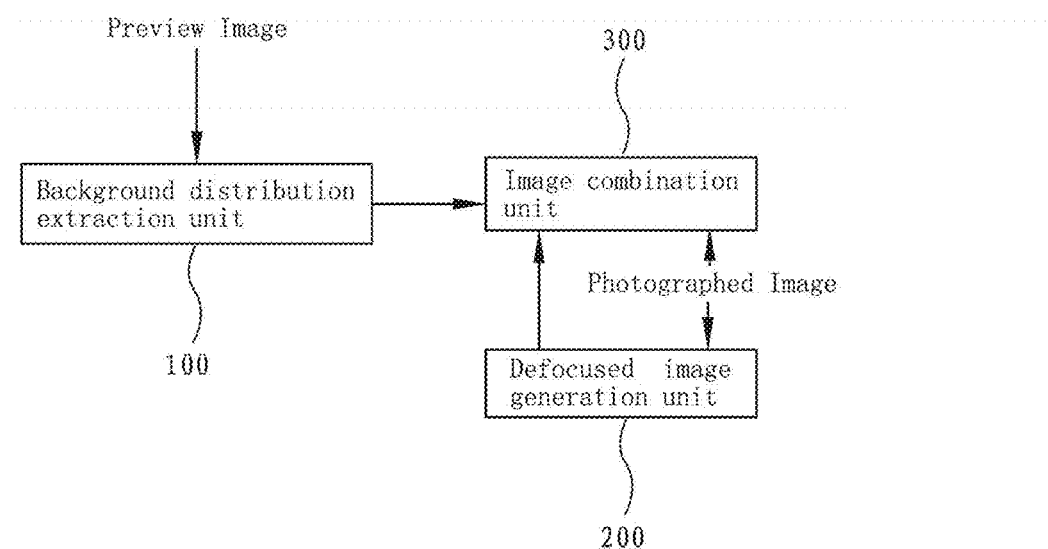
FIG. 1 is a diagram illustrating an example of an apparatus for generating an image with a defocused background.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for generating an image with a defocused background. Referring to FIG. 1, the apparatus includes a background distribution extraction unit 100, a defocused image generation unit 200, and an image combination unit 300.

For example, the background distribution extraction unit 100 may extract a background distribution based on a preview image related to a photographed image. In this example, because the background distribution extraction unit 100 uses the preview image related to the photographed image to extract the background distribution, two or more images do not need to be photographed for extracting the background distribution, thereby simplifying the operations performed by a user. Moreover, unlike the related art, the preview image is not only provided to the user for changing the settings according to the preview effect, but also inputted into the background distribution extraction unit 100 for extracting the corresponding background distribution, which also saves memory space.

The defocused image generation unit 200 may generate a defocused image for the photographed image. For example, the defocused image generation unit 200 may perform a blurring process on the photographed image to generate a corresponding defocused image.

The image combination unit 300 may combine the defocused image with the photographed image based on the background distribution, to generate the image with defocused background. The background distribution may indicate a distribution of a background portion in the image, which may be expressed in various formats. For example, the background distribution may indicate a probability distribution for a pixel of the photographed image belonging to the background, or may indicate a binary segmentation diagram of the background portion and the foreground portion. It should also be appreciated that the background distribution may have other various suitable formats.

The image combination unit 300 may combine the background portion of the defocused image generated by the defocused image generation unit 200 with the foreground portion of the photographed image according to the background distribution extracted by the background distribution extraction unit 100 based on the preview image. Accordingly, in the combined image, the background portion may be based on the defocused image, while the foreground portion may be based on the photographed image, thereby achieving the special effect of the defocused background.

According to some aspects, various manners can be adopted to construct a background distribution extraction unit 100. Hereinafter, one exemplary structure of the background distribution extraction unit 100 is described with reference to FIG. 2.

Figure 2:
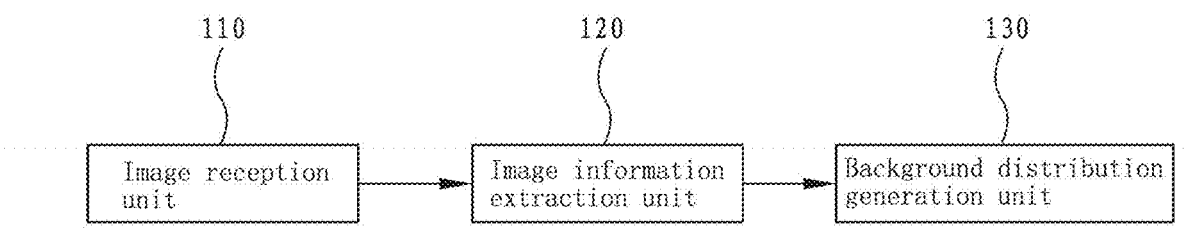
FIG. 2 is a diagram illustrating an example of a background distribution extraction unit.

Referring to FIG. 2, the background distribution extraction unit 100 includes an image reception unit 110, an image information extraction unit 120 and a background distribution generation unit 130. For example, the image reception unit 110 may receive one or more preview images related to the photographed image. As another example, the image reception unit 110 may also receive the photographed image in addition to the preview image. In this case, when the received preview image has a resolution that is different from that of the photographed image, the image reception unit 110 may adjust the preview image to have the same resolution as that of the photographed image. As one example, the image reception unit 110 may reduce the resolution of the photographed image to be the same as that of the preview image.

The image information extraction unit 120 may extract the image information from the preview image (or the preview image(s) and the photographed image) received from the image reception unit 110. For example, the image information may include a pixel value such as a luminance value or a chroma value of the pixel, and the like of the image. As another example, the image information may include information such as the luminance information, the chroma information or the contrast information of the region after the image is divided into a plurality of regions. Accordingly, the image information extraction unit 120 may extract the image information of the preview image and/or the photographed image in a unit of a single pixel or in a unit of a region (such as an image block) comprised of a plurality of pixels. The background distribution generation unit 130 may use the extracted information to generate the corresponding background distribution.

Differences may exist between the background portion and the foreground portion of a photographed image. For example, when a flash is turned on in an indoor environment, the foreground portion will typically become brighter while the brightness of the background typically does not change significantly. As another example, in general, the foreground portion may be relatively clear due to the focusing, while the background portion is relatively vague. Therefore, the background distribution generation unit 130 may estimate the corresponding background distribution based on the extracted image information. As another example, if the background distribution generated by the background distribution unit 130 is not based on the same image size as that of the photographed image (because the resolution of the photographed image is reduced in the image reception unit 110), the background distribution generation unit 130 may perform an interpolation process on the generated background distribution, so as to obtain the background distribution consistent with the resolution of the originally photographed image.

Hereinafter examples of the background distribution extraction unit 100 are described.

In a first example, the photographing operation occurs in an indoor environment where the flash has a significant influence on the brightness of the foreground portion of the image, but has less influence on the brightness of the background portion of the image. In this example, the background distribution extraction unit 100 may extract the background distribution based on the brightness changing degree between the preview image and the photographed image.

The image reception unit 110 may receive both the preview image and the photographed image. In this case, the preview image has the same focal length as that of the photographed image, and the preview image is captured with a flash off and the photographed image is captured with the flash on. As another example, if the preview image has a resolution different from that of the photographed image, the image reception unit 110 may reduce the resolution of the photographed image to correspond with the resolution of the preview image.

Next, the image information extraction unit 120 extracts the image information of both the preview image and the photographed image. For example, the image information extraction unit 120 extracts a luminance value $I_p(x,y)$ of a pixel $P(x,y)$ in the preview image and a luminance value $I_c(x,y)$ of a pixel $P(x,y)$ in the photographed image. Here, x is a horizontal coordinate of the pixel $P(x,y)$ and y is a vertical coordinate of the pixel $P(x,y)$.

The background distribution generation unit 130 generates the corresponding background distribution based on the luminance information $I_p(x,y)$ and $I_c(x,y)$ extracted by the image information extraction unit 120. For example, the background distribution generation unit 130 may calculate an average value $I'_p$ of the pixel luminance in the preview image and an average value $I'_c$ of the pixel luminance in the photographed image respectively, and calculate the probability distribution of each pixel belonging to the background based on the following equation (1):

$$D_{BG}(x,y) = 0.5 + \lambda(I_{p1}(x,y) - I_{c1}(x,y)) \quad (1)$$

Here, $D_{BG}(x,y)$ is a probability of the pixel $P(x,y)$ belonging to the background, $I_{p1}(x,y)=I_p(x,y)-I'_p$, $I_{c1}(x,y)=I_c(x,y)-I'_c$, $\lambda$ is a constant by setting a value of which the value of $D_{BG}(x,y)$ can be varied within the range of [0,1].

For the background portion, the result of $I_{p1}(x,y)-I_{c1}(x,y)$ has a positive value, that is, the brightness of the background portion does not change significantly with a flash on. For the foreground portion, the result of $I_{p1}(x,y)-I_{c1}(x,y)$ has a negative value, that is, the brightness of the foreground portion changes significantly with a flash on. If the result of $I_{p1}(x,y)-I_{c1}(x,y)$ is zero, the probability of a corresponding pixel belonging to the background approaches 0.5 or 50%.

Through the above process, the background distribution generation unit 130 may generate the background distribution indicating the probability distribution of a pixel of the image belonging to the background. As another example, if the background distribution generated by the background distribution generation unit 130 is not based on the same image size as that of the photographed image, for example, because the resolution of the photographed image is reduced in the image reception unit 110, the background distribution generation unit 130 may perform an interpolation process on the generated background distribution, to obtain the background distribution consistent with the resolution of the originally photographed image.

In the example discussed above, the luminance information is extracted in a unit of a single pixel, and the background distribution indicating a probability of each pixel of the image belonging to the background is generated. However, the present description is not limited thereto. For example, it is not necessary to adopt such an accuracy by performing the above process in a unit of a single pixel. For example, the process may be performed for a unit of a region (such as a data block) comprised of a plurality of pixels. Also, although the above example obtains a photographing performance in the indoor environment, the above embodiment of is not limited to the indoor environment. For example, in an outdoor environment, the background distribution may be extracted through the difference between the background brightness change and the foreground brightness change due to the flash.

In a second example, the photographing operation occurs in an outdoor environment in which the difference between the influences by the flash on the background and the foreground of the image is not great. In this example, the background distribution extraction unit 100 may extract the background distribution based on the contrast information of a plurality of preview images.

For example, the image reception unit 110 may receive two or more preview images instead of the photographed image, and the two or more preview images may have different focal lengths. The preview images received by the image reception unit 110 may be divided into two groups. For example, a first group is indicated by FG which includes the preview images with a relatively clear foreground and a second group is indicated by BG which includes the preview images with a relatively clear background. For example, the preview images may be divided into the above two groups according to the different focal lengths corresponding to the preview images. In this example, the preview images whose focal lengths approach the focal length of the photographed image may be classified as the images of the FG ground, and the rest preview images can be classified as the images of the BG group.

In this example, the image information extraction unit 120 may extract the contrast information about a plurality of preview images. For example, each preview image may be divided into a plurality of data blocks, accordingly, the image information extraction unit 120 may extract the contrast information of each data block in the respective preview images.

For example, the image information extraction unit 120 may extract a contrast information $Ci(B)$ of a $B^{th}$ data block in an $i^{th}$ preview image, where $$Ci(B) = \sum_{p(x,y) \in B} ((\nabla_x I_{p(x,y)})^2 + (\nabla_y I_{p(x,y)})^2),$$

in which $P(x,y)$ indicates a pixel, x is a horizontal coordinate of the pixel $P(x,y)$, y is a vertical coordinate of the pixel $P(x,y)$, $I_{p(x,y)}$ indicates a pixel value of the pixel $P(x,y)$, for example, $I_{p(x,y)}$ can indicate the luminance value or the chroma value of the pixel $P(x,y)$, $\nabla_x I_{p(x,y)}$ indicates a gradient of the pixel value $I_{p(x,y)}$ in an x axis, and $\nabla_y I_{p(x,y)}$ indicates a gradient of the pixel value $I_{p(x,y)}$ in a y axis. In this example, the larger the value of the contrast information $Ci(B)$, the richer and clearer the details of the $B^{th}$ data block may be. In contrast, the smaller the value of the contrast information $Ci(B)$ is, the vaguer the $B^{th}$ data block may be.

After the image background extraction unit 120 extracts the contrast information about the respective data blocks in the plurality of preview images, the background distribution generation unit 130 may generate the corresponding background distribution based on the contrast information extracted by the image information extraction unit 120. For example, the background distribution generation unit 130 may calculate a probability of each data block belonging to the background based on the following equation (2):

$$D_{BG}(B) = \frac{\max_{i \in BG} C_i(B)}{\max_{i \in FG} C_i(B) + \max_{i \in BG} C_i(B)} \quad (2)$$

In this example, $D_{BG}(B)$ is the probability of the $B^{th}$ data block belonging to the background, BG is a group of preview images with a relatively clear background portion, and FG is a group of preview images with a relatively clear foreground portion.

In general, as for the background portion, the value of $\max_{i \in BG} C_i(B)$ is larger than that of $\max_{i \in FG} C_i(B)$ so that the value of $D_{BG}(B)$ approaches 1. In contrast, for the foreground portion, the value of $\max_{i \in BG} C_i(B)$ is much than that of $\max_{i \in FG} C_i(B)$ so that the value of $D_{BG}(B)$ approaches 0. In addition, if the values of $\max_{i \in BG} C_i(B)$ and $\max_{i \in FG} C_i(B)$ corresponding to the $B^{th}$ data block are both small (for example, smaller than a preset threshold), it indicates that the data block itself does not have rich details. Therefore, in order to enhance the efficiency when extracting the background distribution, the background distribution generation unit 130 can set the corresponding $D_{BG}(B)$ to be 0.5.

Although in the above example the contrast information is extracted in a unit of a data block, the background distribution can also indicate the probability distribution of the respective pixels of the image belonging to the background, that is, the corresponding $D_{BG}(x,y)$ can be obtained from $D_{BG}(B)$. Furthermore, it is not necessary to perform the above process in a unit of a data block, and the present invention can also adopt a solution for performing the above process in a unit of a single pixel.

Also, although the above example obtains a good photographing performance in the outdoor environment, the above example is not limited to the outdoor environment. For example, in the indoor environment, the background distribution may still be extracted through the contrast information of a plurality of preview images with different focal lengths. In addition, the wider the indoor environment is, the more the extracted background distribution approaches the actual background distribution of the photographed image.

In some aspects, to further enhance the accuracy for extracting the background distribution, the background distribution extraction unit 100 may set different operating manners flexibly. For example, the background distribution extraction unit 100 may combine the processing of the above two example. In this example, the image reception unit 110, the image information extraction unit 120 and the background distribution generation unit 130 in the background distribution extraction unit 100 may determine to function as the first example or the second example based on whether the photographing environment is an indoor environment.

For example, whether to turn on the flash may be detected, and a control signal may be transmitted to the respective units according to the detection result so that the respective units can perform the operations as in the first example or the second example. As another example, the detection result can directly cause the respective units to perform the operations as in the first case or the second case. In this example, when the photographing environment is an indoor environment, the image reception unit 110 receives the preview image and the photographed image. In this example, the preview image may have the same focal length as that of the photographed image, the preview image may be captured with a flash off, and the photographed image may be captured with the flash on. The image information extraction unit 120 may extract the luminance information of the preview image and the photographed image, the background distribution generation unit 130 may generate the background distribution based on the luminance changing degree between the preview image and the photographed image.

As another example, when the photographing environment is the outdoor environment, the image reception unit 110 may receive a plurality of preview images. In this example, the plurality of preview images may have different focal lengths. The image information extraction unit 120 may extract a contrast information of the plurality of preview images, and the background distribution generation unit 130 may generate the background distribution based on the contrast information of the plurality of preview images. According to various aspects, not only the number of the photographed images is reduced by using the preview image, but also the extracted background distribution becomes more accurate by setting different operation manners according to the photographing environment.

The examples described herein are not limited to the above specific manner, and any technique capable of extracting the background distribution from the preview image (and the photographed image) can be applied to the present invention. For example, at least two of the image reception unit 110, the image information extraction unit 120 and the background distribution generation unit 130 may be integrated into a single digital signal processor, without being limited to the structure shown in FIG. 2.

According to various aspects, the image combination unit 300 may combine the defocused image generated by the defocused image generation unit 200 with the actually photographed image based on the above extracted background distribution, thereby generating the image with defocused background.

Figure 3:
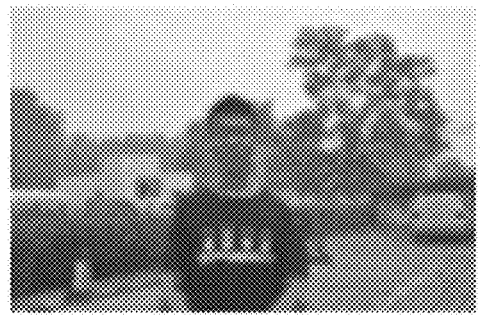
FIG. 3 includes photographs illustrating an example of combining an image.
Figure 3:
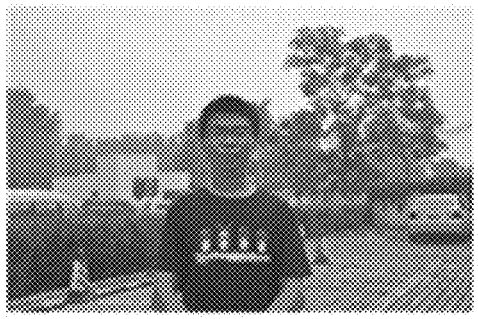
Figure 3:
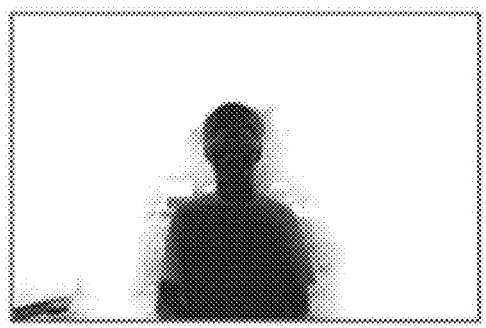
Figure 3:
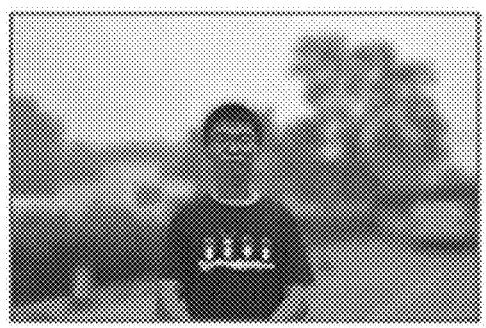

FIG. 3 illustrates an example of photographs for combining an image. Referring to FIG. 3, reference numeral (A) shows the defocused image generated by the defocused image generation unit 200 by performing a blurring process on the photographed image. Reference numeral (B) of FIG. 3 shows the photographed image, wherein, as an alternative manner, the photographed image can be sharpened accordingly. Reference numeral (C) of FIG. 3 shows the background distribution extracted by the background distribution extraction unit 100. Reference numeral (D) of FIG. 3 shows the image with defocused background generated by the image combination unit 300 based on the background distribution.

The image combination unit 300 may generate the image with defocused background. For example, when the background distribution extracted by the background distribution extraction unit 100 is $D_{BG}(x,y)$, the image combination unit 300 may generate the image with defocused background according to the following equation (3):

$$K(x,y) = (1 - D_{BG}(x,y)) \cdot K_B(x,y) + D_{BG}(x,y) \cdot K_c(x,y) \quad (3)$$

In this example, $K(x,y)$ is a pixel value of the pixel $P(x,y)$ in the combined image, $K_B(x,y)$ is a pixel value of the pixel $P(x,y)$ in the defocused image, $K_c(x,y)$ is a pixel value of the pixel $P(x,y)$ in the photographed image. For example, the pixel value can be a luminance value, a chroma value, or various property values of the image.

In some examples, the apparatus for generating the image with defocused background as shown in FIG. 1 may further include a background segmentation unit (not shown) for performing a binarization process on the background distribution to obtain a foreground portion and a background portion, wherein the background distribution indicates a probability distribution for a pixel of the photographed image belonging to the background.

Figure 4:
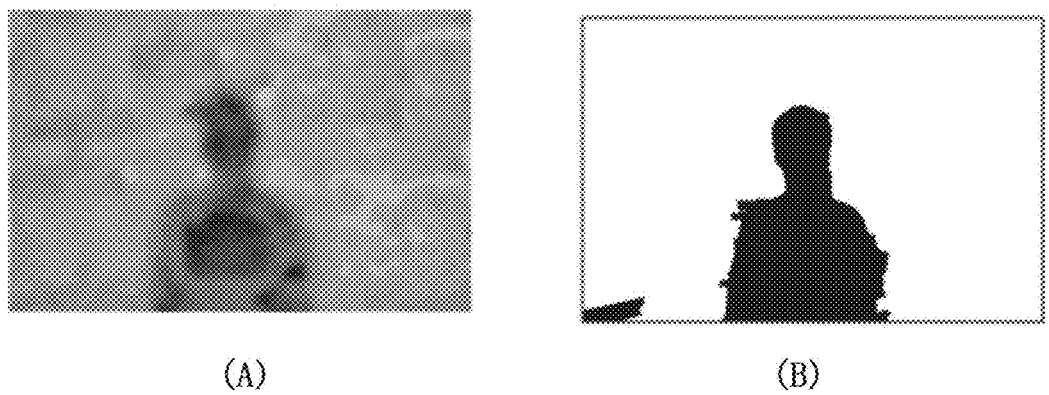
FIG. 4 includes photographs illustrating an example for segmenting the background of an image.

FIG. 4 illustrates an example for segmenting the background. Referring to FIG. 4, reference numeral (A) shows the background distribution extracted by the background distribution extraction unit 100, wherein the background distribution indicates the probability distribution of the pixel of the image belonging to the background. Reference numeral (B) of FIG. 4 shows the foreground portion and the background portion segmented by the background segmentation unit. The background segmentation unit may perform the binarization process on the background distribution based on a max-flow min-cut segmentation algorithm, so as to segment the background portion and the foreground portion. In this example, the image combination unit may combine the background of the defocused image with the foreground of the photographed image based on the foreground portion and the background portion, so as to generate the image with defocused background.

To further improve the accuracy of the background segmentation, the apparatus shown in FIG. 1 may further include a smooth processing unit (not shown) for performing a smoothing process on an edge of the foreground portion and the background portion, so as to obtain a smooth background distribution.

Figure 5:
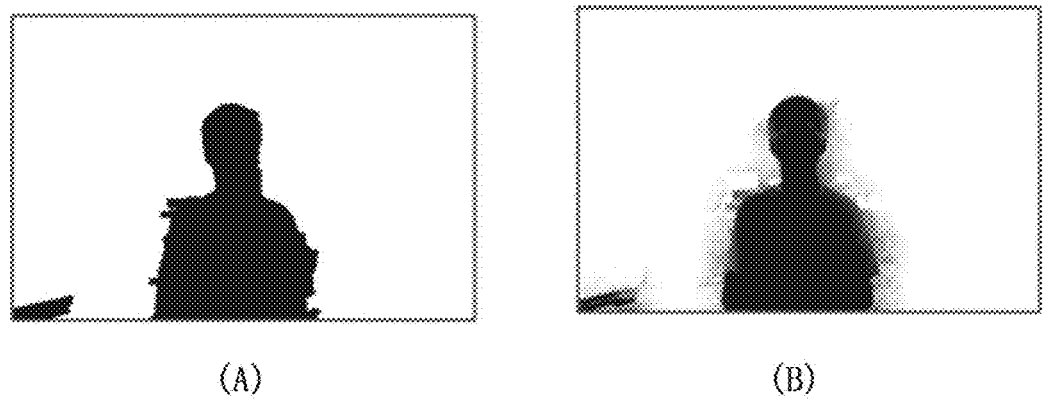
FIG. 5 includes photographs illustrating an example for performing a smooth process on an image.

FIG. 5 illustrates an example for performing a smoothing process. Referring to FIG. 5, reference numeral (A) shows the background portion and the foreground portion segmented by the background segmentation unit. Reference numeral (B) of FIG. 5 shows the smooth background distribution obtained by the smooth processing unit performing the smoothing process on the edge of the foreground portion and the background portion. For example, the smooth processing unit may perform the smoothing process on the edge of the foreground portion and the background portion based on a content of the preview image by using a bilateral filter.

In this example, the image combination unit may combine the defocused image with the photographed image based on the smooth background distribution, so as to generate the image with defocused background. The smooth processing unit may detect whether the pixels on the edge portion are consistent with the surrounding pixels in terms of the content (e.g. in terms of the color). If the color of the pixels on the edge portion is consistent with the surrounding pixels, for example, the smooth processing unit can modify the segmentation result of the pixels on the edge portion to be closed to the segmented portion of the surrounding pixels. For example, if a portion of hairs are classified as the background portion while the surrounding hairs are classified as the foreground portion, the probability of this portion of hairs belonging to the background may be modified to 0.5 or near 0, thereby keeping consistent with the surrounding hairs.

Figure 6:
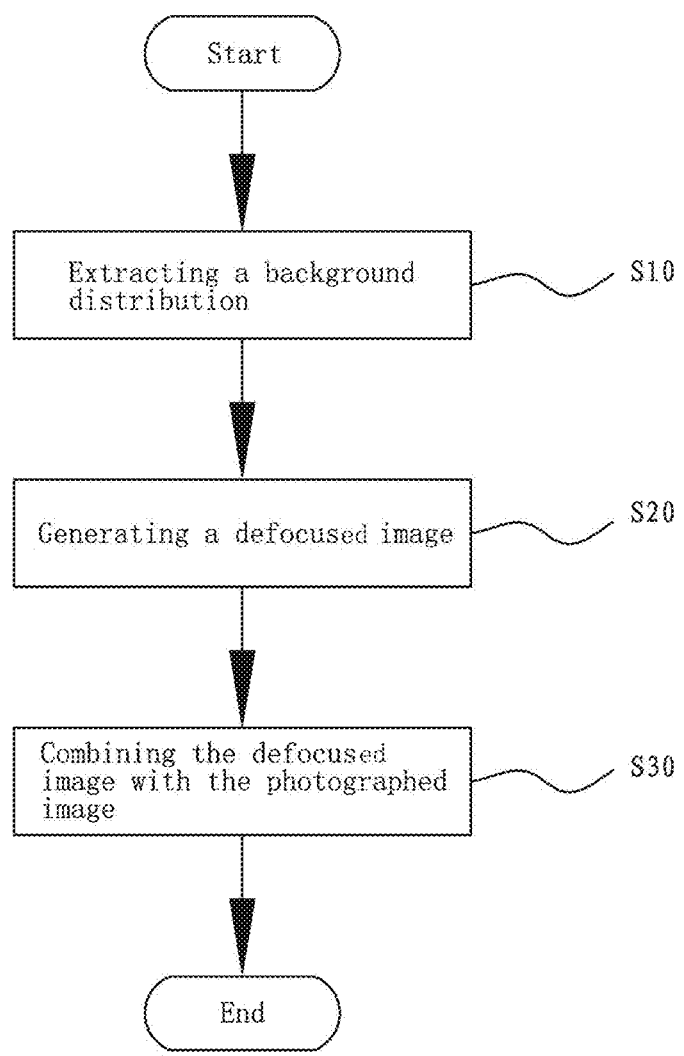
FIG. 6 is flowchart illustrating an example of a method for generating an image with defocused background.

FIG. 6 illustrates an example of a method for generating an image with defocused background. Referring to FIG. 6, in S10, a background distribution is extracted based on a preview image related to a photographed image. For example, the background distribution extraction unit 100 may perform the operation of extracting the background distribution based on the structure shown in FIG. 2. In S20, a defocused image is generated for the photographed image. For example, the defocused image generation unit 200 may adopt any suitable manner to perform a blurring process on the photographed image so as to generate the corresponding defocused image. Here, it should be noted that the performing order of the operation S10 and the operation S20 may be reversed, or the operation S10 and the operation S20 may be performed simultaneously. In S30, the defocused image is combined with the photographed image based on the background distribution, so as to generate the image with defocused background.

In some examples, the method for generating the image with defocused background may further include performing a binarization process on the background distribution extracted in the operation S10, so as to obtain a foreground portion and a background portion. In this example, the background distribution may indicate a probability distribution for a pixel of the photographed image belonging to the background. In this example, in S30, a background of the defocused image may be combined with a foreground of the photographed image based on the foreground portion and the background portion, so as to generate the image with defocused background.

In some examples, the method for generating the image with defocused background may further include performing a smoothing process on an edge of the foreground portion and the background portion to obtain a smooth background distribution. In this case, in S30, the defocused image may be combined with the photographed image based on the smooth background distribution, so as to generate the image with defocused background.

According to various aspects, a preview image is used as the basis for extracting the background distribution. Accordingly, it is not necessary to photograph two or more images for generating a defocused background effect, which may increase the convenience of a user.

According to various aspects, when extracting the background distribution, a different operating manner can be switched to be based on the photographing environment, thereby improving the accuracy of the background extraction.

According to various aspects, when extracting the background distribution based on a plurality of preview images with different focal lengths, the efficiency for background defocusing process can be improved by performing a binarization process on the background distribution. Also, the accuracy for segmenting the background and the foreground can be further improved by a smoothing process.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network is coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating an image with a defocused background, the apparatus comprising:
   a background distribution extraction unit configured to extract a background distribution based on a preview image corresponding to a photographed image;
   a defocused image generation unit configured to generate a defocused image for the photographed image; and
   an image combination unit for combining the defocused image with the photographed image based on the background distribution to generate the image with the defocused background,
   wherein when a photographing environment is an indoor environment, the background distribution extraction unit is configured to extract luminance information of the preview image and the photographed image, and generate the background distribution based on a luminance changing degree between the preview image and the photographed image, and
   when the photographing environment is an outdoor environment, the background distribution extraction unit is configured to extract contrast information of a plurality of preview images, and generate the background distribution based on the contrast information of the plurality of preview images.

2. The apparatus of claim 1, further comprising:
a background segmentation unit configured to perform a binarization process on the background distribution to obtain a foreground portion and a background portion,
wherein the background distribution indicates a probability distribution of a pixel of the photographed image belonging to the background, and
the image combination unit is configured to combine a background of the defocused image with a foreground of the photographed image based on the foreground portion and the background portion to generate the image with defocused background.

3. The apparatus of claim 2, further comprising:
a smooth processing unit configured to perform a smoothing process on an edge of the foreground portion and the background portion to obtain a smooth background distribution,
wherein the image combination unit combines the defocused image with the photographed image based on the smooth background distribution to generate the image with defocused background.

4. The apparatus of claim 2, wherein the background segmentation unit performs the binarization process based on a max-flow min-cut segmentation algorithm.

5. The apparatus of claim 3, wherein the smooth processing unit performs the smoothing process on the edge of the foreground portion and the background portion based on a content of the preview image using a bilateral filter.

6. The apparatus of claim 1, wherein the preview image has a same focal length as that of the photographed image, the preview image is captured with a flash off, and the photographed image is captured with the flash on.

7. The apparatus of claim 1, wherein the plurality of preview images comprise different focal lengths.

8. The apparatus of claim 1, wherein the background distribution extraction unit comprises:
an image reception unit configured to receive the preview image and the photographed image when the photographing environment is the indoor environment, the preview image comprising a same focal length as that of the photographed image, the preview image being captured with a flash off, and the photographed image being captured with the flash on, and further configured to receive the plurality of preview images when the photographing environment is the outdoor environment, the plurality of preview images comprising different focal lengths;
an image information extraction unit configured to extract the luminance information of the preview image and the photographed image when the photographing environment is the indoor environment, and configured to extract the contrast information of the plurality of preview images when the photographing environment is the outdoor environment; and
a background distribution generation unit configured to generate the background distribution based on the luminance changing degree between the preview image and the photographed image when the photographing environment is the indoor environment, and configured to generate the background distribution based on the contrast information of the plurality of preview images when the photographing environment is the outdoor environment.

9. The apparatus of claim 8, wherein the background distribution extraction unit is further configured to determine whether the photographing environment is the indoor environment or the outdoor environment based on whether the flash is on.

10. The apparatus of claim 7, wherein each preview image is divided into a plurality of data blocks, the image information extraction unit is configured to extract the contrast information of the plurality of data blocks in the respective preview images, and the background distribution generation unit is further configured to calculate a probability of each data block belonging to the background based on the contrast information,
wherein the image information extraction unit is further configured to extract contrast information $Ci(B)$ of a $B^{th}$ data block in an $i^{th}$ preview image based on an equation of $$Ci(B) = \sum_{p(x,y) \in B} ((\nabla_x I_{p(x,y)})^2 + (\nabla_y I_{p(x,y)})^2),$$

where P (x,y) indicates a pixel, x is a horizontal coordinate of the pixel P (x,y), y is a vertical coordinate of the pixel P (x,y), $I_{p(x,y)}$ indicates a pixel value of the pixel P (x,y), $\nabla_x I_{p(x,y)}$ indicates a gradient of the pixel value $I_{p(x,y)}$ in an x axis, and $\nabla_y I_{p(x,y)}$ indicates a gradient of the pixel value $I_{p(x,y)}$ in a y axis, and
the background distribution generation unit is further configured to calculate a probability of the $B^{th}$ data block belonging to the background based on an equation of $$D_{BG}(B) = \frac{\max_{i \in BG} C_i(B)}{\max_{i \in FG} C_i(B) + \max_{i \in BG} C_i(B)},$$

where $D_{BG}(B)$ indicates the probability of the $B^{th}$ data block belonging to the background, BG indicates a first group of preview images, FG indicates a second group of preview images, and background portions of the first group of preview images are clearer than those of the second group of preview images.

11. A method for generating an image with a defocused background, the method comprising:
extracting a background distribution based on a preview image corresponding to a photographed image;
generating a defocused image for the photographed image; and
combining the defocused image with the photographed image based on the background distribution to generate the image with the defocused background,
wherein the extracting the background distribution based on the preview image comprises:
in response to a photographing environment being an indoor environment, extracting luminance information of the preview image and the photographed image, and generating the background distribution based on a luminance changing degree between the preview image and the photographed image; and
in response to the photographing environment being an outdoor environment, extracting contrast information of a plurality of preview images, and generating the background distribution based on the contrast information of the plurality of preview images.

12. The method of claim 11, further comprising:
performing a binarization process on the background distribution to obtain a foreground portion and a background portion, wherein the background distribution indicates a probability distribution for a pixel of the photographed image belonging to the background;
performing a smoothing process on an edge of the foreground portion and the background portion to obtain a smooth background distribution; and
combining the defocused image with the photographed image based on the smooth background distribution to generate the image with the defocused background.

13. The method of claim 12, wherein the preview image has a same focal length as that of the photographed image, and the preview image is captured with a flash off and the photographed image is captured with the flash on; and
the plurality of preview images have different focal lengths.

14. An image processing device comprising:
an extractor configured to extract a background distribution of a photograph based on a preview image of the photograph;
a defocuser configured to perform a blurring operation on the photograph to generate a defocused image; and
a combiner configured to combine the photograph and the defocused image based on the background distribution to generate a photograph with a defocused background,
wherein when a photographing environment is an indoor environment, the extractor is configured to extract luminance information of the preview image and the photographed image, and generate the background distribution based on a luminance changing degree between the preview image and the photographed image, and
when the photographing environment is an outdoor environment, the extractor is configured to extract contrast information of a plurality of preview images, and generate the background distribution based on the contrast information of the plurality of preview images.

15. The image processing device of claim 14, wherein a foreground of the photograph with the defocused background is not defocused.

16. The image processing device of claim 14, the preview image being captured without a flash and the photograph being captured with the flash.

17. The image processing device of claim 14, wherein the extractor is configured to generate the background distribution for each pixel included in the background of the photograph.

18. The image processing device of claim 14, wherein the plurality of preview images comprise different focal lengths.

19. The image processing device of claim 18, wherein the extractor is further configured to divide each preview image into data blocks which each include a plurality of pixels, and the extractor is configured to generate the background distribution for each data block included in the background of the photograph.

20. The image processing device of claim 19, wherein the extractor is configured to divide the plurality of preview images into two groups including a first group which includes one or more preview images with a clearer foreground and a second group which includes one or more preview images with a clearer background, based on focal lengths of the plurality of preview images.

21. The apparatus of claim 1, further comprising:
an image reception unit configured to adjust the preview image to have the same resolution as the photographed image in response to the preview image having a resolution different from the photographed image.

22. The apparatus of claim 1, further comprising:
an image information extraction unit configured to extract image information from the preview image, wherein the image information includes a pixel value including at least one of a luminance value and a chroma value of a pixel.

23. The apparatus off claim 22, wherein the image information includes luminance information, chroma information, and contrast information of a region after the preview image and the photographed image is divided into a plurality of regions.

24. The apparatus of claim 22, wherein the image information extraction unit is configured to extract the image information in a unit of single pixel or in a unit of a region comprised of a plurality of pixels.

* * * * *